United States Patent [19]
Palazzolo et al.

[11] 3,940,538
[45] Feb. 24, 1976

[54] DECORATIVE MELAMINE LAMINATES WITH HIGH YIELD CORE STOCK

[75] Inventors: Salvatore E. Palazzolo, Hampton; Harold O. McCaskey, Jr., Allendale, both of S.C.

[73] Assignee: Westinghouse Electric Corporation, Pittsburgh, Pa.

[22] Filed: Sept. 1, 1972

[21] Appl. No.: 285,697

[52] U.S. Cl. .............. 428/318; 162/141; 162/149; 428/530; 428/531; 428/535
[51] Int. Cl.² .... B32B 5/14; B32B 5/26; B32B 5/28; D21H 5/14
[58] Field of Search .......... 161/263, 264, 268, 270, 161/413; 162/141, 149; 428/530, 531, 535, 318

[56] References Cited
UNITED STATES PATENTS

| | | | |
|---|---|---|---|
| 1,374,931 | 4/1921 | Lewis | 161/268 |
| 2,566,130 | 8/1951 | Karlson et al. | 162/149 |
| 2,658,828 | 11/1953 | Pattilloch | 162/141 |
| 2,665,221 | 1/1954 | Grangaard | 161/264 |
| 2,680,995 | 6/1954 | Frost et al. | 161/264 |
| 2,723,179 | 11/1955 | Murtfeldt | 162/141 |
| 3,090,700 | 5/1963 | Ball et al. | 161/264 |
| 3,294,622 | 12/1966 | Wark | 161/268 |
| 3,418,189 | 12/1968 | Grosheim | 161/264 |

Primary Examiner—George F. Lesmes
Assistant Examiner—Charles E. Lipsey
Attorney, Agent, or Firm—A. Mich, Jr.

[57] ABSTRACT

High yield resin saturable papers containing total lignin, based on paper weight, in amounts from about 8 up to 15 percent are employed as core stock for high pressure decorative melamine laminates. At least 65 percent of the fibers should be hardwood fibers. Up to 35 percent of softwood fibers may be present but then the softwood lignin, based on paper weight, should not be greater than about 2.8 percent.

10 Claims, 3 Drawing Figures

DECORATIVE MELAMINE LAMINATES WITH HIGH YIELD CORE STOCK

BACKGROUND OF THE INVENTION

High-pressure decorative laminates have been widely employed in the building industry as counter and table tops, bathroom and kitchen work surfaces, furniture and cabinets, wall paneling and partitions and doors. Because they are durable and resistant to scratching and various liquids and heat, the high-pressure decorative laminates have been popular in the furniture industry, primarily as tops for furniture where they not only provide an attractive appearance matching adjacent natural wood finishes but also a surface more desirably durable than wood.

In the production of such furniture tops, it is necessary to cut or otherwise machine the top to the desired dimensions and configuration. This may be accomplished by simultaneously machining a stack of laminates which are thereafter individually bonded to a rigid structural base member or by first bonding a laminate sheet to a rigid base member of substantial thickness and then machining the composite. Irrespective of the method, the laminate must be machined. The hard durable surface provided by the laminate is relatively difficult to machine and carbide-tipped tools are frequently employed to reduce tool wear and minimize the down-time involved in sharpening tools. Machinability and tool wear are, accordingly, particularly important factors in the use of high-pressure decorative laminates for furniture because of the extensive machining that must be done. It is also a factor in most other applications because some machining is generally necessary.

Another property factor exists in handling such laminates, particularly large sheets, such as 5 × 12 foot sheets. A sheet that large and only 1/16 inch thick will deflect or bend considerably if not completely supported during handling. If not handled carefully, the large sheets may crack and thus render the entire sheet or a major portion thereof useless. It should be apparent that increasing the amount of deflection at rupture (flexural strength) would alleviate the handling problem. The foregoing problem is, of course, even more severe with thinner laminates such as the standard 1/32 inch thick laminates which are growing in commercial significance.

High-pressure decorative laminates are, of couse, themselves laminated articles comprising plural layers of synthetic resin impregnated paper sheets consolidated or bonded together into a unitary structure under heat and pressure. Conventionally, the decorative or print layer is a sheet of high quality purified alpha cellulose fiber and/or certain rayon fibers impregnated with a thermosetting condensation resin such as aminotriazine aldehyde resins, for example melamine formaldehyde resins. An overlay sheet, transparent when cured, may be employed to protect the decorative or print layer and is also a sheet of alpha cellulose, or the like, impregnated with an aminotriazine aldehyde. The overlay and print sheets are bonded to a plurality of core or body sheets of fibrous cellulosic material, usually kraft paper, most generally impregnated with a thermosetting phenol-formaldehyde resin. The major portion of the paper in a decorative laminate is composed of the core or body sheets rather than the print or overlay sheets. Typically seven or eight core sheets are consolidated with only a single print and single overlay sheet to form a conventional 1/16 inch decorative laminate.

Although the core sheets are less expensive than the print or overlay sheets, it is apparent that the core sheets are a significant cost factor, because of their volume in a decorative laminate. It is also apparent that many of the properties of the paper-base decorative laminates are derived from the papers employed as well as the resins employed. The properties of the core stock paper, then, will influence the properties of the end product decorative laminate.

Historically, in high-pressure decorative laminates, the core stock paper has been a relatively extensively cooked, low yield, high purity saturating grade kraft paper having a lignin content in the order of 2 to 5%, by weight. All percentages hereinafter expressed are weight percentages unless otherwise stated. The purpose of cooking is to dissolve the lignin and other non-cellulose portions of the wood which bind the cellulose fibers together, thereby providing a pulp of free fibers which can be formed into a sheet of paper. Mixtures of hardwood and softwood species may be employed, the former providing relatively short fibers (0.5 to 2 mm. avg. length) and the latter providing relatively long fibers (2.5 to 5 mm. avg. length) in the paper. The paper must be well formed, have uniform texture, density and finish and be free of fiber bundles, hard lumps, large wood slivers, streaks, light areas and wrinkles. One of the most important properties of the paper is its absorbency. The paper must absorb a high percentage of resin to provide a satisfactory laminated product.

The properties of the laminated product, e.g. tensile strength, flexural strength, impact strength, the amount of absorption and thickness swell from immersion in boiling water and dimensional changes over an extreme range of relative humidity, are significantly influenced by the core stock paper. The laminated product should meet the standards set forth in NEMA Publication No. LD1-1971 for Laminated Thermosetting Decorative Sheets and the core stock papers must not preclude the obtention of the properties set forth in those standards.

The extensively cooked, low yield core stock papers are, of course, relatively high in cost. The advantages of a high yield paper for core stock in terms of lower relative cost and decreased pollution of water and air have provided the incentive for a considerable effort on the part of applicants and others to develop a high yield paper that could be used for the core stock of high-pressure decorative laminates. The most obvious direction, because of cost and the general and conventional desirability for long fibers in paper making, appeared to be a high yield kraft sheet made from a pulp containing a high proportion of soft or coniferous woods, particularly Southern pine species.

Working extensively with pulps containing in the order of 90% or more of the long fibered pine, a saturating core sheet was developed and successfully used to produce excellent high-pressure decorative laminates meeting all of the requirements set forth in the NEMA standards. Unexpectedly, we discovered that the laminates made from such core sheets caused severe wear and rapid deterioration of the carbide cutting tools conventionally employed in the normal fabrication into finished forms, particularly in furniture goods where extensive machining must be done. These core stock sheets, made from essentially all pine furnishes, at one point had relatively high lignin contents, in the order of fifteen (15) percent. We further discovered that the same pine furnishes, cooked to lower yield levels having lignin contents of 7–8 percent and below, produced laminates which met the NEMA standards, as one might then expect, but the tool degradation persisted to an unacceptable degree.

SUMMARY OF THE INVENTION

We have discovered a high yield saturating core stock paper with lignin contents as high as 15 percent that can be employed as the core stock for high-pressure decorative laminates. The laminates meet all of the requirements set forth in the NEMA Standards. More importantly, the laminates do not cause rapid tool wear. The paper is characterized by a high yield hardwood component, preferably 65 percent or higher. Up to about 35 percent of a lower yield softwood component such as southern pine may be present. The core stock paper contains from about 8 to 15 percent lignin, but the lignin must be primarily hardwood lignin to avoid rapid tool deterioration. Laminates with this core stock are also tougher. Because they can deflect more before rupturing, they are less susceptible to damage during handling.

DESCRIPTION OF THE INVENTION

FIG. 1 of the accompanying drawing is a schematic view of an assembly of sheets constituting a make-up for a high-pressure decorative laminate;

Figure 1:
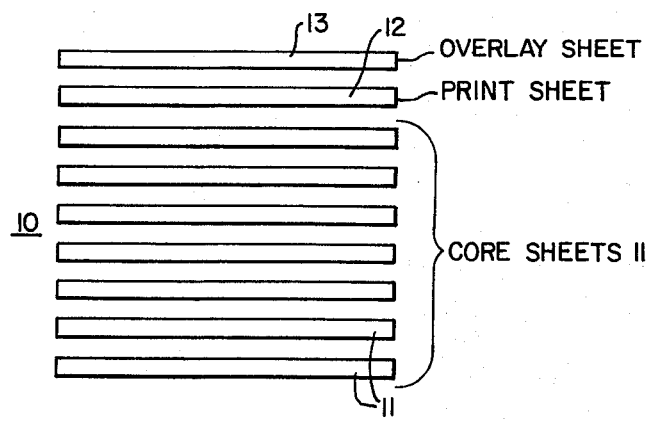

Referring now to FIG. 1, the make-up assembly 10, is composed of a plurality of core sheets 11 prepared by impregnating the core stock paper (described in detail hereinafter) with a phenol-formaldehyde resin solution. The impregnated paper is heated to drive off the solvent and to advance the thermosetting resin to a dry non-tacky but fusible "B" stage. Similarly a print or pattern sheet 12 is prepared by impregnating an alpha cellulose paper with a melamine-formaldehyde solution, heating to drive off the solvent and advance the resin to a dry non-tacky but fusible "B" stage. The print or pattern sheet 12 carries the decorative print or pattern provided by either pigmenting the paper or by printing a design thereon. An overlay sheet 13, similar to sheet 12 but carrying no print or pattern, may be employed to provide additional protection for the decorative pattern. Sheets 12 and 13 are superposed upon the core sheets 11, as shown, and the assembly 10 is placed between stainless steel caul paltes and inserted into a hydraulic press with heated platens. At a temperature in the order of 260°F to 300°F and a pressure of 700–1500 psi, the assembly is cured and consolidated into the unitary structure illustrated in FIG. 2 after a total residence time in the order of 1 hour.

Figure 2:
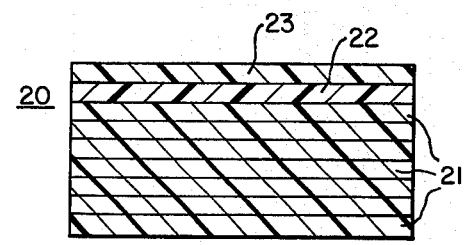
FIG. 2 is a cross-sectional view of a consolidated laminate.

Referring now to FIG. 2, the high-pressure decorative laminate 20 is composed to a core 21, a decorative print or pattern sheet 22 and a transparent protective overlay sheet 23 consolidated and bonded together to form a unitary structure.

The core stock paper, in accordance with the present invention, is a high yield, high lignin paper. The paper contains lignin in the order of from about 8 up to 15 percent. It is essential, however, that a major portion of the total lignin be hardwood lignin. Any softwood lignin present must constitute less than a major portion and preferably only a minor portion of the total lignin.

It should be understood that in accordance with our discovery, the major amounts of softwood lignin that are present in a high yield softwood core stock paper, for example, a kraft-cooked essentially all Southern pine pulp, will produce laminates that will rapidly wear carbide cutting tools, even though other standard property requirements, particularly NEMA standards, may be met. Well-cooked all Southern pine pulps, containing softwood lignin in the order of 8 percent will, when employed as core stock, produce laminates with somewhat lower but nonetheless unacceptably rapid tool wear.

According to the general principles of our invention, therefore, an essentially all hardwood high yield pulp, containing from about 8 up to 15 percent by weight of hardwood lignin will prove to be a decorative laminate core stock saturating paper that will provide laminates that not only meet all of the requirements of the NEMA standards but will not cause rapid tool wear. It may, however, be advantageous for the purpose of forming the paper on the screen to include some longer-fibered softwood pulp. Small or minor amounts of softwood will contribute only minor amounts of softwood lignin and the laminates made from such core stocks will still provide the advantages of our discovery. As the softwood content increases, however, it should be cooked more to remove more of the softwood lignin and lower softwood yields must be tolerated. Up to about 35 percent of softwood is the maximum practical upper limit for the benefits of our discovery.

The softwood lignin should not be present in amounts greater than about 2.8 percent of the total weight of paper. As noted heretofore, if only small amounts of softwood are to be included, the softwood does not have to be extensively cooked. It will not require substantial cooking to make a softwood component that will not contribute more than about 2.8 percent of softwood lignin. As the amount of softwood in the blend increases, more cooking or digesting will be necessary to assure a softwood lignin content not greater than 2.8 percent. At the maximum total lignin content of 15 percent, the softwood lignin can be about 2.8 percent while the hardwood lignin is about 12.2 percent. At the lower total lignin limit, the softwood again may be about 2.8 percent while the hardwood lignin is about 5.2 percent. The softwood lignin may, of course, be less or be totally absent without encountering machining and tool wear problems.

We recognize that it is extremely difficult, if not impossible, to quantatively distinguish between hardwood and softwood lignins, particularly in a finished paper sheet. It is, however, possible to measure total lignin content in individual pulps before blending and/or in the chips before treatment to design a process for a particular combination of wood chips that will produce a paper in accordance with the foregoing principles. If a paper is not designed so that the softwood lignin does not exceed about 2.8 percent, machining problems will be encountered and efforts to use high yield papers will be frustrated.

It should also be understood that the stated respective amounts of hardwood and softwood fibers in the high yield, high lignin core stock paper of this invention, refer to the respective amounts of hard and soft wood chips, by weight, that are employed to make the paper. Those stated amounts also apply to the respective proportions of the fibers in the finished paper, which may be estimated in an accuracy range of about ± 5 wt.% by staining and counting the fibers under a microscope in accordance with known principles.

There are, of course, a substantial number of different pulping processes that are in general use in the paper making industry and those generally used chemical, semi-chemical and chemi-mechanical pulping processes, individually or in combination for pulp blends, may be used to prepare the pulp or furnish for the core stock papers of this invention. The principles of our discovery are believed to be applicable to any process. It should be recognized, however, that in general hardwoods contain somewhat smaller amounts of lignin than softwoods and that the hardwood lignin is more readily removed than softwood lignin in most chemical pulping processes. If a mixture of hardwood and softwood chips is to be exposed to a kraft cook as a mixture, for example, one should recognize that the hardwood contains a smaller concentration of lignin which will be more rapidly removed. The proportion of hardwood to softwood chips should be selected in view of this knowledge so that the paper contains lignins in accordance with our discovery. It may be advantageous, for example, to separately pulp the hardwood and softwood chips and later blend the pulps. Recognizing that the individual paper maker is influenced by various factors such as cost of chemicals and cost and availability of individual wood species, particularly because of geographic location, we believe our discovery can be advantageous to the industry in general.

It should be understood that a wide veriety of processes or combinations of processes can be employed to make a core stock paper for use in decorative laminates in accordance with our discovery. The process generally known as the semi-chemical process, however, is particularly advantageous in preparing high yield, high lignin hardwood pulp because only small amounts of lignin are inherently removed. The semi-chemical cook is designed to primarily soften the lignin. The subsequent mechanical treatment, variously called defiberizing, refining or beating, reduces the pulp or chips to the fibrous state suited for paper making. Yields from this process are generally higher than other conventional pulping processes because less lignin and less hemicellulose are removed. Suitable semi-chemical (and other suitable conventional pulping processes) are described in various tests, for example *Pulp and Paper Science and Technology*, Vol. 1, C. Earl Libby, Editor, McGraw-Hill Book Co. (1962), pp. 133–346 and *Pulp and Paper*, Vol. 1, J. P. Casey, Interscience Publishers, Inc. (1952) pp. 66–218.

EXAMPLE 1 — PREPARATION OF PAPER

Figure 3:
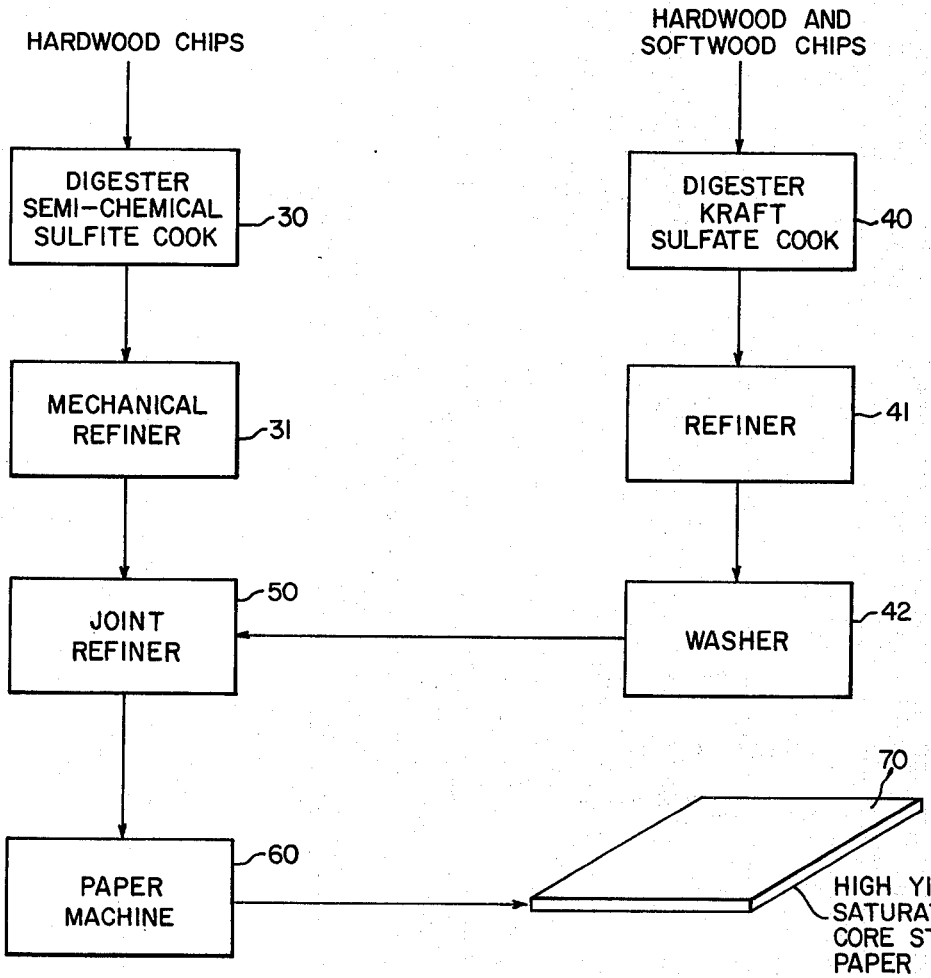
FIG. 3 is a flow chart illustrating the preparation of an example of a core stock paper of this invention.

Referring now to FIG. 3, a mixture of oak, gum, maple and poplar (hardwood) chips is subjected to a semi-chemical sulfite cook in digester 30, the details of which are well known. After sufficient digestion to primarily soften the lignin which cements the cellulose fibers together (some lignin is, of course, removed), the cooked chips are dropped and led to the mechanical refiner 31 where, for example, disk mills break down and defiber the chips. The pulp must be sufficiently refined to provide a uniform pulp essentially free of large slivers of wood.

In a separate operation, a mixture of hardwood (as above) and softwood (southern pine species) chips in a weight proportion of about 20 parts hardwood: 80 parts softwood is fed to a kraft or sulfate digester 40 where the chips are cooked, in a known manner, to a Kappa No. of 52 (about 7.3 percent lignin). It should be noted at this point that standard methods were employed to determine the amount of lignin (TAPPI T-13) and the KAPPA or "K" number (TAPPI T-236), the latter also an indication of the lignin content. The coarse raw pulp is passed through a refiner 41 where fiber bundles are broken up. The refined pulp is washed in washer 42 both for the purpose of purifying the fibers and recovering alkali which may be reused in a known manner.

The semi-chemical pulp and the kraft pulp are blended together in a weight proportion of about 70 parts of semi-chemical pulp and 30 parts of kraft pulp. The blended pulp has a Kappa No. of 94 and contains about 13.6 percent lignin. The blended pulps are jointly refined in refiner 50. Some care must be taken in the respective refining operations so that the pulp fed to the paper machine 60 will provide a finished saturating core stock paper 70 that can be penetrated by the impregnating resin. The paper should have an apparent density of about 2.7–3.1 as pounds per 1,000 square feet per pcint (mil) of caliper and an air porosity (with a 1 inch orifice and 20 inch cylinder) of 5 to 15 seconds/100 cc. of air per ADTM D20 or TAPPI T412. This more "open" sheet is desired for rapid and thorough resin penetration in the resin paper treater.

To obtain a proper apparent density and air penetration in the foregoing example, the normal refining of the kraft cooked pump was reduced so that the pulp resulting from the joint refining could be refined to a Canadian freeness number of 575–600. Without that reduction in the kraft refining, the pulp after the joint refining produced too dense a sheet. A dense sheet would be more difficult to impregnate with resin and undesirable lower paper treating speeds would have to be employed. The refining of the semi-chemical cooked pulp had to be carried out to the point of eliminating large wood slivers and could not be reduced below that point.

It should be understood that although other papers are suitable, the combination of a semi-chemical sulfite cooked hardwood component and a kraft sulfate cooked hardwood-softwood mixture does offer unique advantages because the processes most conveniently and economically provide the proper lignin balance for this invention. Thus, papers containing from about 8 up to 15 percent lignin with a major portion thereof being hardwood lignin may be produced from a blend of (A) about 65 to 80 percent of semi-chemical hardwood pulp fibers and (B) about 20 to 35 percent of a kraft pulp mixture of (1) between about 50 to 90 percent softwood fibers and (2) between about 10 to 50 percent hardwood fibers, said kraft mixture being cooked to a Kappa or "K" between about 25 and 60. A blend of 70 percent of (A) and 30 percent of (B) is particularly suitable, as noted in Example 1. An apparent density of 2.7–3.1 and an air porosity of about 5–15 seconds will permit the paper to be rapidly and properly penetrated with the phenol-formaldehyde resin in the paper treater.

Hardwoods, also known as angiosperms, of deciduous trees, have short fiber lengths of about 0.5 to 2.0 mm, and lignin contents in the order of 17–26 percent. Examples of suitable hardwood species are oak, elm, poplar, gumwood, maples, basswood, birch, beech and hickory. Softwoods, also known as gymnosperms, of evergreen or coniferous trees have long fiber lengths of about 2.5 to 3.0 mm for eastern species and 3.5 to 5.0 mm for southern and western species and lignin contents in the order of 25 to 32 percent. Examples of suitable softwood species are pine, fir, hemlock, redwood, cypress and cottonwood. Examples of pine species are yellow, white, jack, longleaf, shortleaf, lodgepole and slash.

Commercially available corrugating medium paper used extensively for corrugated boxes is a blend of semi-chemical sulfite cooked hardwood pulp and a kraft cooked mixture of hardwood and softwood contain large wood slivers, has a porosity of 20–25 seconds, and a total lignin content of 16–17 percent (Kappa No. 107.8). This commercially available paper or liner board was not suitable for the core stock of high pressure NEMA decorative laminates because of large slivers which transfer to designs in the print sheet.

Both the resin saturability and the rate of penetrability by the resin also make this corrugating medium paper generally unsuitable for use as core stock in NEMA grade high pressure decorative laminates. In addition to the more general problems of appearance because of transfer through the melamine impregnated sheets, it was not possible to produce laminates which meet the NEMA water boil test. It was, in any event, apparent that the total lignin content of over 16 percent did not provide a paper that was suitable for use as core stock in NEMA grade high pressure decorative laminates. As should be apparent from Example 1, the semi-chemical cook had to be extended, primarily to additionally soften the lignin so that the pulp would be free of clumps, large slivers of wood, etc. after refining. The kraft cook was extended for the same reason and, more importantly, to remove the softwood lignin which creates the problems in machining. The softwood lignin in the blend was less than 2.8 percent.

EXAMPLE 2 — LAMINATE PREPARATION

A make up assembly of standard B-staged melamine formaldehyde resin impregnated overlay and print sheets and seven (7) sheets of the core stock paper described in Example 1 impregnated with B-staged phenol-formaldehyde resin are superimposed in a known manner and inserted into a press where they are subjected to a standard press cycle of approximately one hour at 1000–1500 psi and heated to a peak temperature of about 300°F. This laminate will meet all of the standards set forth in NEMA specifications and machine as well as better than laminates made with the typical low yield highly refined saturating kraft grade core stock paper. It should be noted that the low yield grades contain in the order of 2.5 to 5 percent lignin and are, of course, much more expensive than the high yield paper of Example 1. Moreover, the laminates with the high yield core stock papers are less susceptible to cracking during handling than the low yield papers. Laminates with the high yield core will exhibit a deflection at rupture at least in the order of 0.08–0.09 inches compared to about 0.06–0.07 for the low yield papers when tested in accordance with ASTM Method D790-61.

The machinability test was run on a stack of 12 inch × 18 inch samples of 1/16 inch laminates. Each laminate sample was separated from another by an easily machinable 1/8 inch Luan veneer separator. A stack of samples was simultaneously machined on a shaper employing a three inch shaper blade head with a carbide tip. The blade was supplied by Lineberry Foundry under the number 32,278 and had a K-1 hardness. Feeding the sample stack at a moderate speed, about 0.035 inches was removed at each pass. After 750 passes, the carbide tip was examined at 10× magnification. It was relatively simple to identify portions of the blade tip with specific laminate samples because the Luan separators gave no observable wear. Laminates having a core of the high yield core stock in accordance with this invention machined as easily as those having the expensive low yield saturating kraft core, both showing only slight dulling and cratering of the blade. Laminates having a core of a high yield all pine kraft cooked paper (Kappa number of 90) severely dulled and cratered the blade. Laminates having a core of a medium yield all pine kraft cooked paper (Kappa number of 38) exhibited some improvement in machinability but the tool wear was still excessive and more severe than with the high yield high hardwood cores of our invention.

It should be understood that this invention is applicable to the variety of resin systems known and available to those skilled in the art of high pressure decorative laminates. The melamine-formaldehyde resins in the print and overlay sheets and the phenol-formaldehyde resins in the core sheets may be modified in accordance with principles known in the art without foregoing the advantages which attend the use of the high yield high hardwood core stock of this invention.

It should also be understood that the high yield high hardwood core stock can be substituted either in whole or in part of the traditionally employed highly refined low yield saturating kraft core stock, which contains no more than 5 percent total lignin, in the laminate assembly. Where, for example, the decorative print on the print sheet is particularly susceptible to observable transfer of occasional large fibers in the core sheet adjacent thereto, one or more low yield core sheets may be disposed between the print sheet and the high yield core sheets. Alternatively, the high yield core sheets may be sandwiched between low yield core sheets. Even those low yield sheets should contain no more than about 2.8 percent softwood lignin.

The advantages of lower cost, improved machinability and increased deflection before rupture for those making and/or using high pressure decorative laminates should be readily apparent from the foregoing description. It should also be noted, however, that a broader advantage also exists insofar as the use of high yield papers reduces the cutting of trees and reduces both the volume of chemicals used and the wastes therefrom which must be disposed.

We claim:

1. A high pressure decorative laminate comprising a unitary consolidated combination of (1) a melamine formaldehyde resin impregnated decorative paper layer bonded to (2) a base of a plurality of core sheets impregnated with a phenol formaldehyde resin, at least a portion of the core sheets having an apparent density of about 2.7–3.1 and an air porosity of about 5–15 seconds and having an essentially homogeneous distribution of both hardwood and softwood cellulosic fibers and essentially free of wood slivers containing from about 8 up to 15 percent total lignin based on total weight, at least about 65 percent of said fibers being hardwood fibers, a major portion of said lignin being hardwood lignin, the softwood lignin not exceeding about 2.8 percent of the total weight.

2. The decorative laminate of claim 1 wherein said softwood fibers comprise about 35 percent of the fibers.

3. The decorative laminate of claim 2 wherein at least a portion of said hardwood fibers are derived from a sulfite semi-chemical pulping process and said softwood fibers are derived from a kraft pulp process.

4. The decorative laminate of claim 1 wherein a highly refined low yield saturating kraft core sheet containing no more than about 5 percent total lignin is disposed between the decorative layer and said portion of core sheets.

5. The decorative laminate of claim 4 wherein said portion of core sheets is sandwiched between sheets of said low yield saturating kraft.

6. A high pressure decorative laminate comprising a unitary consolidated combination of (1) a melamine formaldehyde resin impregnated overlay paper bonded to (2) a melamine formaldehyde resin impregnated print sheet bonded to (3) a base of a plurality of core sheets impregnated with a phenol formaldehyde resin, at least a portion of said core sheets having an apparent density of about 2.7–3.1 and an air porosity of about 5–15 seconds and containing a total of from about 8 up to 15 percent total lignin, the softwood lignin not exceeding about 2.8 percent of the total weight, comprising a blend of:
  A. about 65 to 80 percent of semi-chemical hardwood pulp fibers, and
  B. about 20 to 35 percent of a kraft pulp mixture of (1) between about 50 to 90 percent softwood fibers and (2) between about 10 to 50 percent hardwood fibers, said kraft mixture having a "K" number between about 25 and 60.

7. The decorative laminate of claim 6 wherein said hardwood fibers are selected from the group consisting of gum, maple, poplar and oak fibers and mixtures thereof and the softwood fibers are selected from the group pine species consisting of yellow, jack, longleaf, shortleaf, lodgepole and slash pine fibers and mixtures thereof.

8. A high pressure decorative laminate comprising a unitary consolidated combination of (1) a decorative layer comprising a sheet of alpha cellulose paper and (2) a core layer comprising at least one resin saturable paper sheet having an apparent density of about 2.7–3.1 and an air porosity of about 5–15 seconds and having an essentially homogeneous distribution of both hardwood and softwood cellulosic fiber and essentially free of wood slivers containing from about 8 up to 15 percent total lignin based on the total weight of the saturable sheet, at least above 65 percent of said fiber being hardwood fibers, the softwood lignin in said saturable sheet not exceeding about 2.8 percent of the said total weight, said decorative layer impregnated with a melamine-formaldehyde resin and said core layer impregnated with a phenol-formaldehyde layer.

9. The decorative laminate of claim 8 wherein said saturable sheet consists essentially of about 70 percent semi-chemical pulp hardwood fibers and about 30 percent of kraft pulp mixtures of hardwood and softwood fibers.

10. The decorative laminate of claim 8 further characterized in having a machined surface.

* * * * *